H. V. VAN ETTEN.
Catching and Holding Animals.
No. 85,413.
Patented Dec. 29, 1868.
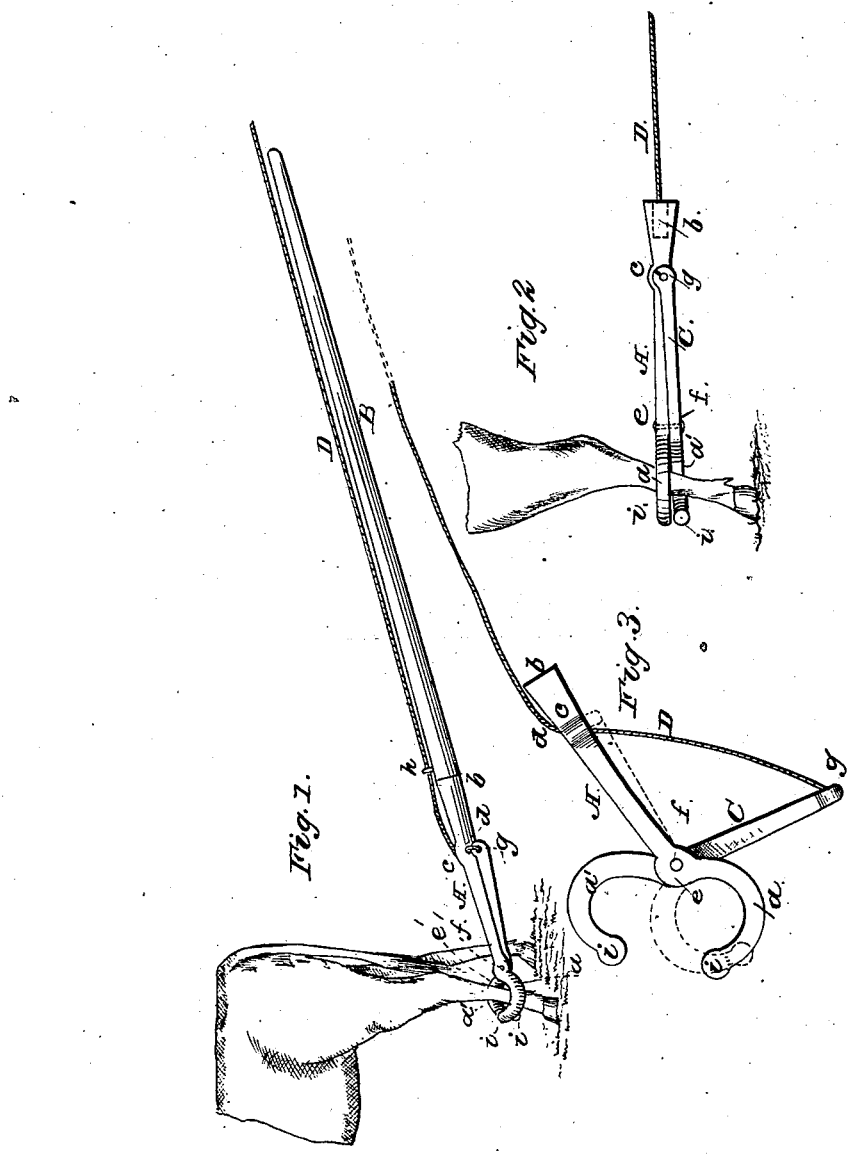

H. V. VAN ETTEN, OF AUBURN, NEW YORK.

*Letters Patent No. 85,413, dated December 29, 1868.*

DEVICE FOR CATCHING AND HOLDING DOMESTIC ANIMALS.

The Schedule referred to in these Letters Patent and making part of the same.

*To all whom it may concern:*

Be it known that I, H. V. VAN ETTEN, of Auburn, in the county of Cayuga, and State of New York, have invented a new and improved Device for Catching and Holding Animals; and I do hereby declare the following to be a full, clear, and exact description thereof, sufficient to enable those skilled in the art to understand the same, reference being had to the accompanying drawing, forming part of this specification, and in which—

Figure 1 is a perspective view,

Figure 2, a plan or top view, and

Figure 3, a side view of my improved device.

The object of my invention is to provide a simple and effective instrument for catching and holding refractory animals, as sheep and hogs, and devised as an improvement upon the well-known shepherds' crook.

My device consists of two curved arms, one of which is adapted to be fixed to a pole, while the other is pivoted. To this latter a cord is attached, whereby the arm is operated so as to make its curved portion overlap the corresponding portion of the other arm, thereby grasping and retaining the leg of the animal, as will be hereinafter more fully described.

In order to enable others to fully understand my invention, so as to make use of it, I will now proceed to describe the same in detail, referring to the accompanying drawing, wherein similar letters indicate corresponding parts in the several figures.

In the drawings—

A represents the arm, which is adapted to be fixed on pole B. The upper part of this arm is curved, as at $a$.

In its opposite end is formed a socket, $b$, for the reception of extremity of pole B.

Through the enlarged portion $c$ of the shank or arm A, is formed an eye, $d$, for the passage of the operating-cord D.

The shank is also slightly enlarged at $e$.

C is the pivoted arm or lever, whose fulcrum consists of a pin, $f$, passing through the part $e$ of shank A, and also through a similar enlargement on the swinging arm. This latter, C, is also formed with a curved portion, $a'$, corresponding to that of the shank A.

The operating-cord D is attached at $g$ to the arm C, and thence passes through the eye $d$ of arm A, and the guide $h$, fixed in the pole B. This cord should extend to the end of the pole, so as to be held in hand.

It will be observed that the curved parts $a$ $a'$ of the arms A C, respectively, are formed with rounded enlargements, $i$ $i$.

It will be further noticed that, when the straight portion of the pivoted arm is brought into contact with the shank of the fixed arm A, the curved portion $a'$ overlaps the part $a$.

The operation of my device will be readily understood.

When the instrument is to be used for catching tame animals, the pole B and cord may be detached, and the arms grasped by the hands, and operated.

On approaching the animal to be secured, the arms may be held open to receive its leg, or they may be opened by placing the enlarged and rounded end of the curved portion of the pivoted arm against the leg of the animal, and then moving the fixed arm slightly, until the leg enters between the ends of the arms. Then, by drawing cord C, the arm is moved so that its curved portion overlaps the corresponding portion of arm A, thus enclosing the animals' leg. The animal may now be led wherever desired, and it releases itself when the cord is let loose.

It will be observed that my device may be used in catching wild animals, but it will prove especially useful in drove-yards, slaughter-pens, and in driving animals to market.

Having thus described my invention,

I claim as new, and desire to secure by Letters Patent—

The device for catching animals, consisting of part A, cast with opening $d$, pole-socket $b$, and the semicircular curve $a$, and the part $c$, cast with semicircular curve $a'$, when said curves form a complete circle, and have their ends bulbed and overlap each other, and arms A C bear against each other, and all parts are constructed and adapted to operate, as herein represented and described.

To the above, I have signed my name, this 14th day of October, 1868.

H. V. VAN ETTEN.

Witnesses:
 JOHN A. WIEDERSHEIM,
 PHIL. F. LARNER.